United States Patent [19]

Hamblin et al.

[11] 4,126,362
[45] Nov. 21, 1978

[54] BEARING CAGES WITH FLEXIBLE WIPERS TO PREVENT ACCUMULATION OF FOREIGN MATTER BETWEEN BALL POCKETS

[75] Inventors: Ronald F. Hamblin, Luton; John P. Forknall, Dunstable, both of England

[73] Assignee: SKF Industrial Trading and Development Company B. V., Nieuwegein, Netherlands

[21] Appl. No.: 747,695

[22] Filed: Dec. 6, 1976

[30] Foreign Application Priority Data

Dec. 17, 1975 [GB] United Kingdom ............... 51622/75

[51] Int. Cl.² ............................................. F16C 33/41
[52] U.S. Cl. .............................. 308/201; 29/148.4 C; 308/187.1
[58] Field of Search ............... 308/188, 189 R, 195, 308/196, 216, 217, 218, 201, 235, 236, 187, 187.1; 29/148.4 R, 148.4 B, 148.4 C

[56] References Cited

U.S. PATENT DOCUMENTS

| 3,414,341 | 12/1968 | Murphy | 308/187.1 |
| 3,788,714 | 1/1974 | Degioia et al. | 308/201 |

FOREIGN PATENT DOCUMENTS

| 1,400,987 | 1/1969 | Fed. Rep. of Germany | 308/201 |
| 1,370,890 | 10/1974 | United Kingdom | 308/201 |

Primary Examiner—Trygve M. Blix
Assistant Examiner—Charles E. Frankfort
Attorney, Agent, or Firm—Watson, Cole, Grindle & Watson

[57] ABSTRACT

A plastic cage for a ball bearing in which flexible wipers are disposed between the ball pockets and extend axially at least as far as the projections which define the mouths of the pockets.

5 Claims, 15 Drawing Figures

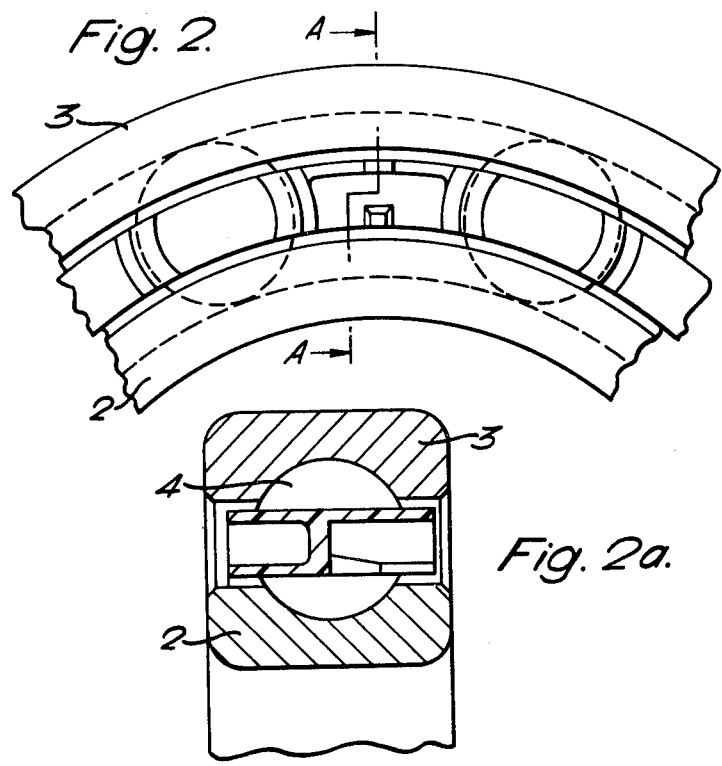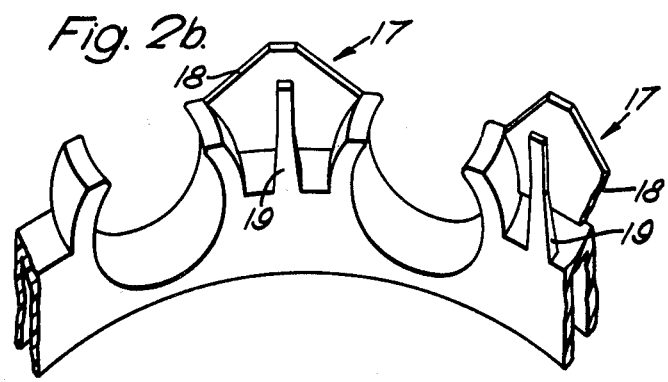

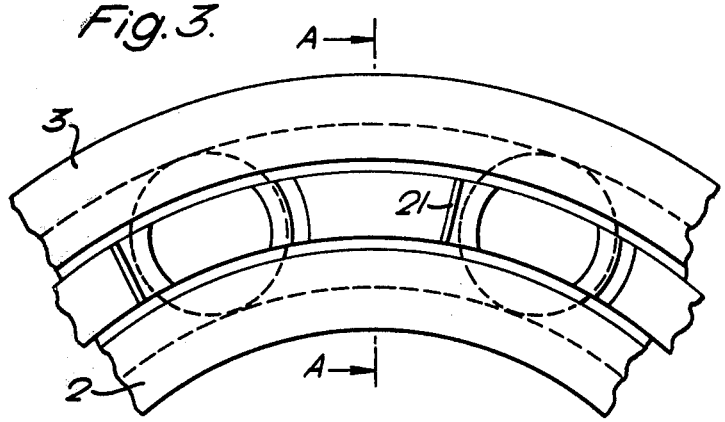
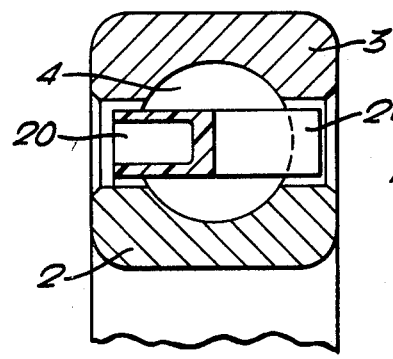
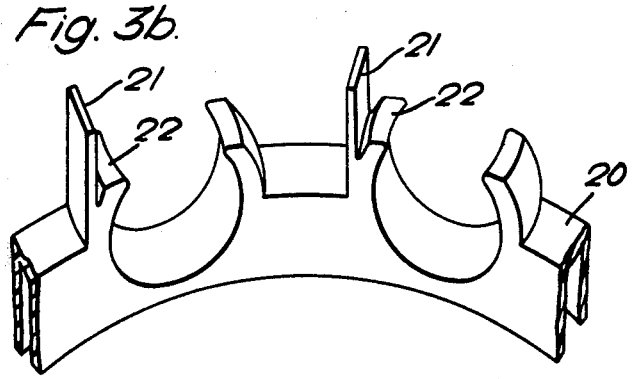

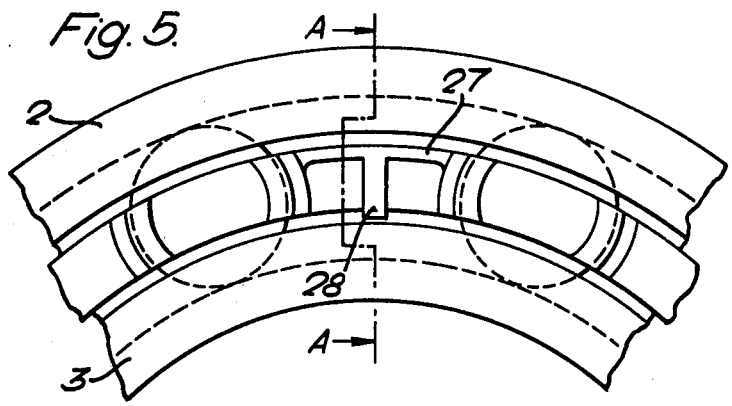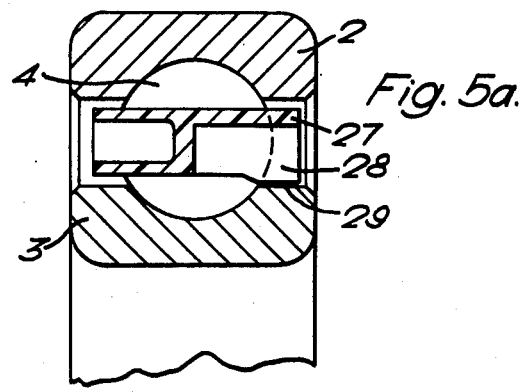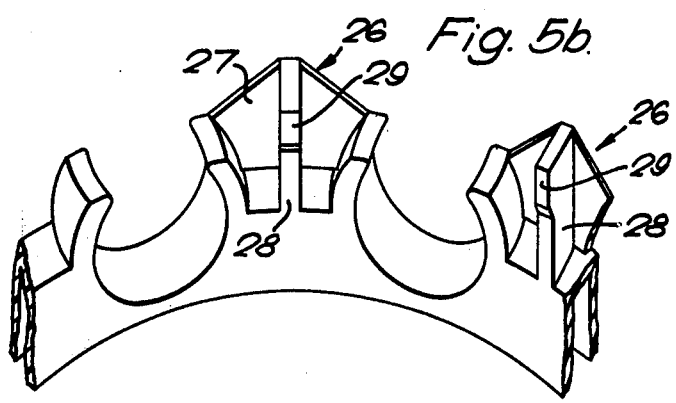

BEARING CAGES WITH FLEXIBLE WIPERS TO PREVENT ACCUMULATION OF FOREIGN MATTER BETWEEN BALL POCKETS

BACKGROUND OF THE INVENTION

This invention relates to a plastic cage for a ball bearing having means to discourage foreign matter from entering the bearing raceways when the bearing in which the cage is assembled is in use.

The invention is concerned with cages of the kind having an annular wall and spaced part-spherical pockets, a part of each pocket being formed by a recess in the annular wall, the remainder of the pocket being formed by two projections which extend axially from the annular wall with the mouth of the pocket between them.

SUMMARY OF THE INVENTION

The invention particularly relates to certain constructions of cages in which projections between adjacent ball pockets constitute wipers to deflect foreign matter which would otherwise enter the space contained between adjacent ball pockets and thus prevent the foreign matter from being eventually deposited on the raceway of the bearing rings.

The type of application where deflector wipers would be of significant value is, for example, in conveyor plant where the bearings in the conveyor belt support rollers rotate at relatively moderate-slow speeds and where the environment in which they operate is very arduous in terms of dust and dirt. It has been found that the foreign matter has a tendency to build up on the stationary bearing ring land and where the stationary ring is the inner ring, this build up also occurs on the adjacent shaft. When the dust/dirt builds up it becomes unstable and cascades into the bearing-raceways thereby leading to rapid seizure of the bearing.

The object of the deflector wipers, therefore, is to discourage the entry of foreign matter into the bearing raceways via the space between the ball pockets and to prevent the build up of material on the bearing lands by wiping with projections from the cage. To give the fullest protection, the wipers and projections are sited between or adjacent all the ball pockets.

In one embodiment of the invention, a cage of the kind described has a flexible wiper located between adjacent pockets, the wipers extending axially from the annular wall in the same direction as and further than the adjacent projectons of the adjacent pockets and extending over at least the full radial width of the cage, each wiper being spaced from the adjacent projections of adjacent pockets and the flexibility of the wipers being such that the wipers readily deflect when foreign material impinges on them or the wipers engage the other parts of the bearing.

In another embodiment of the invention a cage of the kind described has a bridging element and a wiper located between adjacent pockets; the bridging elements and the wipers extend axially from the annular wall in the same direction as and further than the adjacent projections of the adjacent pockets; each bridging element extends along one circumferential edge of the cage and connects together the adjacent projections; and each wiper is spaced from the adjacent projections.

The wiper may have a surface protruding axially from the other circumferential edge of the cage.

According to a feature of the invention, each wiper may be either connected to or spaced from its associated bridging element.

Yet another embodiment of the invention provides a cage of the kind described having a flexible wiper, which is formed integrally with one projection of adjacent cage pockets. The wiper may extend axially from the annular wall in the same direction as and further than said one projection. The wiper might otherwise form an extension of the free end of said one projection.

BRIEF DESCRIPTION OF THE ACCOMPANYING DRAWINGS

FIG. 1b is a perspective view of part of the cage shown in FIGS. 1 and 1a;

FIG. 2 is a view of an embodiment which is similar to that of FIG. 1 but has a composite form of deflector wiper;

FIG. 2a is a section on the line AA of FIG. 2;

FIG. 2b is a perspective view of part of the cage shown in FIGS. 2 and 2a;

FIG. 3 is a view of another embodiment, which has another form of barrier integral with one projection of a ball pocket;

FIG. 3a is a section on the line AA in FIG. 3;

FIG. 3b is a perspective view of part of the cage shown in FIGS. 3 and 3a;

FIG. 4b is a perspective view of part of the cage shown in FIGS. 4 and 4a;

FIG. 5 is a view of an embodiment similar to that shown in FIG. 2 but in which the two parts of the barrier are integral;

FIG. 5a is a section on the line AA of FIG. 5; and

FIG. 5b is a perspective view of part of the cage shown in FIGS. 5 and 5a.

DESCRIPTION OF THE PREFERRED EMBODIMENTS

Figure 1:
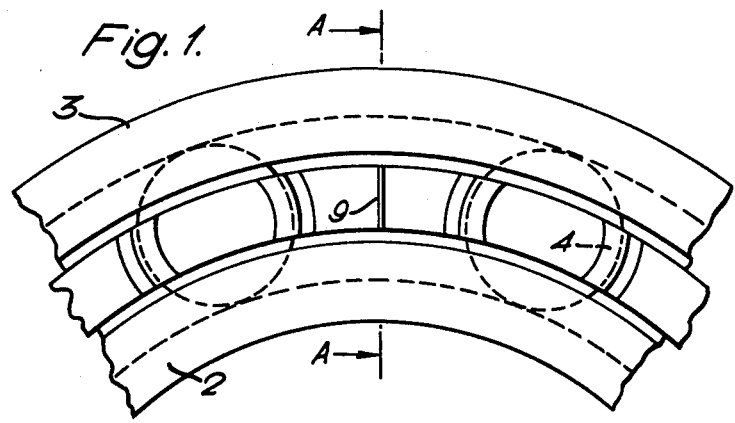
FIG. 1 is an axial view of part of a ball bearing fitted with a cage according to a first embodiment of the invention.
Figure 1A:
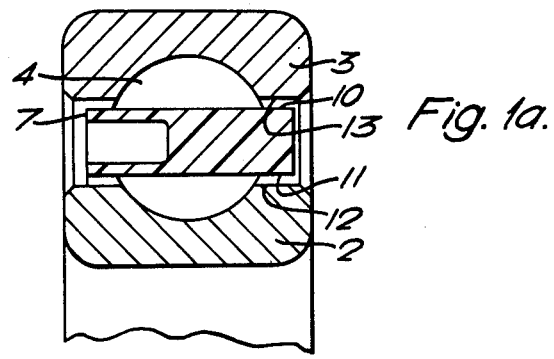
FIG. 1a is a section on the line AA in FIG. 1.
Figure 1B:
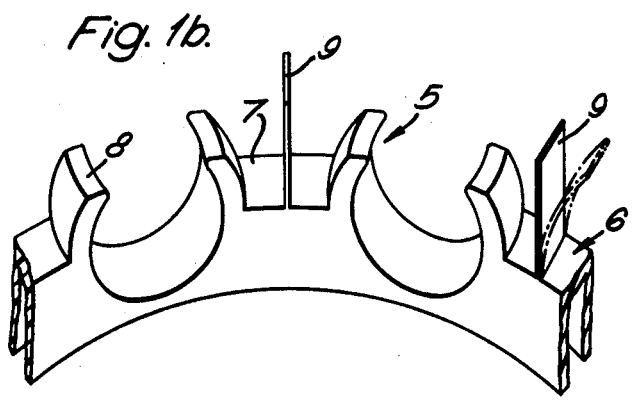

Referring now to FIGS. 1, 1a and 1b of the drawings, there is shown part of a ball bearing comprising an inner race ring 2, an outer race ring 3 and an annular series of balls 4 arranged to roll on the raceway of both bearing rings. The balls 4 are each located in a cage pocket 5 which is an integral part of a plastic cage 6. Each pocket is formed in part by a part-spherical recess in an annular wall 7 of the cage and the remainder of the pocket being formed by a pair of projections 8 integral with the annular wall with the mouth of the pocket located between the pair of projections. A ball which comes into contact with the free ends of the pair of projections will be snapped into the pocket through the mouth thereof when an axial force is applied to the cage. This snap action is effected by the resilient bending of the projections 8 away from each other and the resilient flexing of the pocket 5 about an axis which is radial of the cage, through its base.

In some constructions of cages according to the invention a single flexible wiper is disposed in the space around the circumference of the cage between the adjacent projections of adjacent cage pockets. In the embodiment shown in FIGS. 1 and 1a the wiper 9 is rectangular in elevation (but might have a taper towards its free end) and extends axially in the same direction as and further than the adjacent projections 8. The wiper 9 extends across the full radial width of the cage so that the radial faces 10, 11 of the wiper in the assembled cage are closely adjacent the shoulders 12, 13 of the inner and outer race rings 2, 3 respectively of the bearing (FIG. 1a). The wiper is flexible and is intended to be readily deflected by foreign matter or by engagement with other parts (such as the lands of the bearing). As can be seen in FIG. 1a, the wiper projects axially to terminate close to one axial end face of both races so as to provide a deflector against which foreign matter can impinge and thence discourage the entry into the bearing raceways. The radial faces 10, 11 act as wipers to discourage foreign matter from collecting on the surface of the shoulders 12, 13. As can be seen from FIG. 1b, the wiper 9 is in the form of a thin web and is generally thinner than the projections 8 of the adjacent pockets 5.

FIGS. 2, 2a and 2b show a composite barrier 17 which comprises a bridging element 18 and a wiper 19. The bridging element 18 and the wiper 19 extend axially from the annular wall of the cage in the same direction as and further than the adjacent projections. The wiper 19 is spaced from both adjacent projections and from the bridging element and tapers towards its free end. Foreign matter which is deflected by the wiper 19 is prevented from passing into the outer ring raceway by the bridging piece.

In FIGS. 3, 3a and 3b of the drawings there is shown a cage 20 similar in construction to those described in connection with previous embodiments but in which each flexible wiper is formed integrally with one projection of a ball pocket. In FIG. 3 the wiper 21 is integral with the projection 22 and extends axially from the annular wall of the cage in the same direction as and further than projection 22. The wiper 21 extends across the full radial width of the cage 20 whereby the radial faces thereof perform the wiping action described in connection with FIG. 1.

Figure 4:
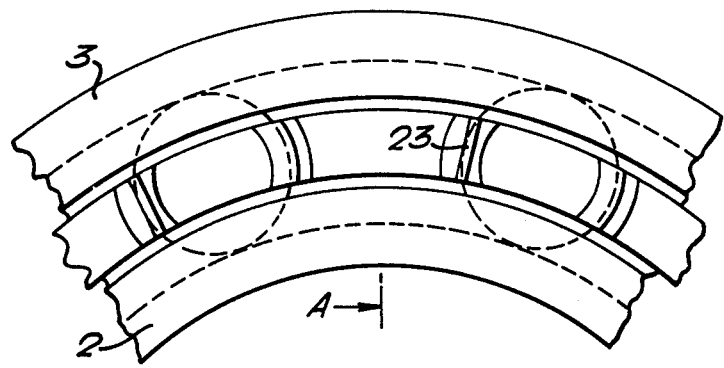
FIG. 4 is a view of another embodiment in which the wiper is an integral extension of one projection of a cage pocket.
Figure 4A:
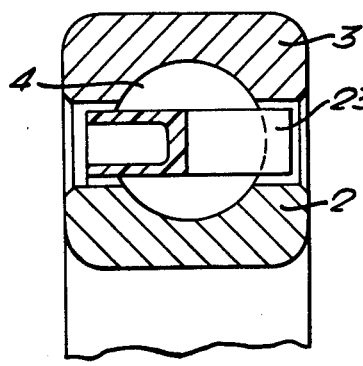
FIG. 4a is a section on the line AA of FIG. 4.
Figure 4B:
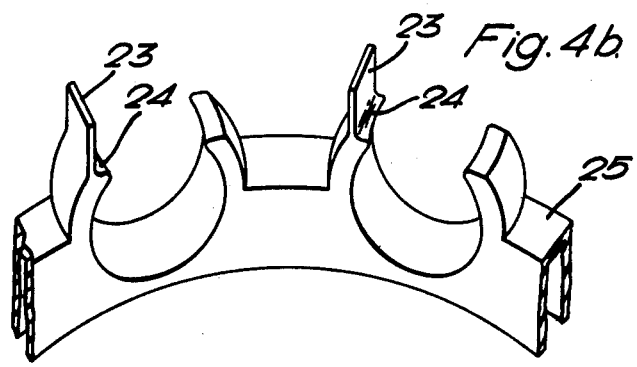

In FIGS. 4, 4a and 4b the flexible wiper 23 is integral with and extends axially from the free end of projection 24 and also extends across the full radial width of the cage 25.

FIGS. 5 to 5b show a construction 26 similar to that shown in FIGS. 2 to 2b. The construction 26 in this embodiment comprises a bridging element 27 and an integral wiper 28 extending radially from the bridging element 27. The radially inner face of the wiper is stepped to provide a shoulder 29 which, when the cage is assembled lies closely adjacent the land 30 on the inner bearing race 3. This construction does not unduly increase the frictional resistance should the cage rub against the bearing land in use. The bridging element slopes from the wiper to each adjacent projection: the bridging element may be squared, to be the same height overall as the wiper, in order to provide an additional restraint on the entry of foreign matter into the space between adjacent pockets. The same modification could be made to the construction shown in FIGS. 2, 2a and 2b.

It is envisaged that some modifications can be made to the embodiments described above. For example, in those embodiments where the wiper is located in the space between adjacent projections of adjacent cage pockets, the wiper may be relatively thin in the circumferential direction of the cage. It will be appreciated that with such a construction the wiper is readily flexible and is not sufficiently robust to deflect a ball into an adjacent cage pocket. It is also envisaged that the wiper described in connection with FIGS. 1, 1a and 1b of the drawings could be formed to extend at an angle to the true radial direction of the cage.

The wipers 21, 23 could also be substantially thinner than as shown and deflect in the opposite direction of rotation to that of the cage when foreign material impinges on the wipers or when the wipers rub on the bearing lands.

We claim:

1. A plastic cage for a ball bearing and comprising:

an annular wall and a plurality of spaced part-spherical pockets, a part of each pocket being formed by a respective recess in the annular wall and the remainder of the pocket being formed by two respective projections which extend away from the annular wall with the mouth of the pocket between them; and a plurality of flexible wipers, each wiper being disposed between a respective pair of adjacent pockets and extending axially from the annular wall in the same direction as and further than the adjacent projections of the pockets and over at least the full radial width of the cage, each wiper being spaced from the adjacent projections of adjacent pockets and comprising a thin web which is generally thinner than the adjacent projections of adjacent pockets, and sufficiently flexible that the wipers can readily deflect when foreign material impinges on them or the wipers engage other parts of the bearing and also insufficiently robust to deflect a ball into an adjacent cage pocket.

2. A plastic cage for a ball bearing and comprising:

an annular wall and a plurality of spaced part-spherical pockets, a part of each pocket being formed by a respective recess in the annular wall and the remainder of the pocket being formed by two respective projections which extend away from the annular wall with the mouth of the pocket between them; and a respective bridging element and a respective wiper between adjacent pockets, the bridging elements and the wipers extending axially from the annular wall in the same direction as and further than the adjacent projections of the adjacent pockets, each bridging element extending along one circumferential edge of the cage and connecting together the adjacent projections and each wiper being spaced from the adjacent projections and comprising a thin web which is generally thinner than the adjacent projections of adjacent pockets, and sufficiently flexible that the wipers can readily deflect when foreign material impinges on them or the wipers engage other parts of the bearing and also insufficiently robust to deflect a ball into an adjacent cage pocket.

3. A cage according to claim 2 in which each wiper has a surface protruding axially from the other circumferential edge of the cage.

4. A plastic cage for a ball bearing and comprising:

an annular wall and a plurality of spaced part-spherical pockets, a part of each pocket being formed by a recess in the annular wall and the remainder of the pocket being formed by two projections which extend away from the annular wall with the mouth of the pocket between them; and a plurality of flexible wipers, each wiper being formed integrally with one projection of a respective cage pocket and forming an extension of a free end of said one projection, the flexibility of the wipers being such that the wipers can readily deflect when foreign material impinges on them or the wipers engage other parts of the bearing.

5. A cage according to claim 4 in which the wiper extends axially from the annular wall in the same direction as and further than the said one projection.

* * * * *